May 23, 1939.  L. H. THOMAS ET AL  2,159,869
SOLDERING IRON
Filed June 22, 1936
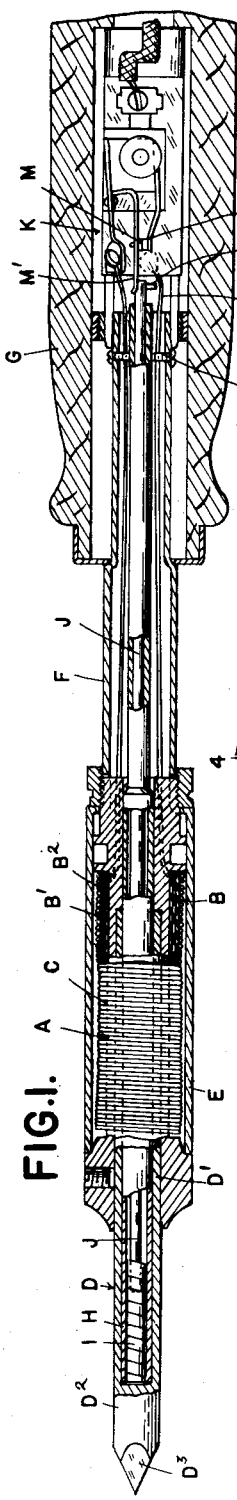
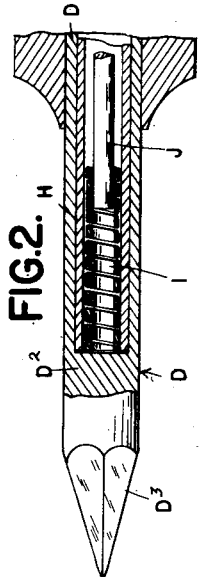
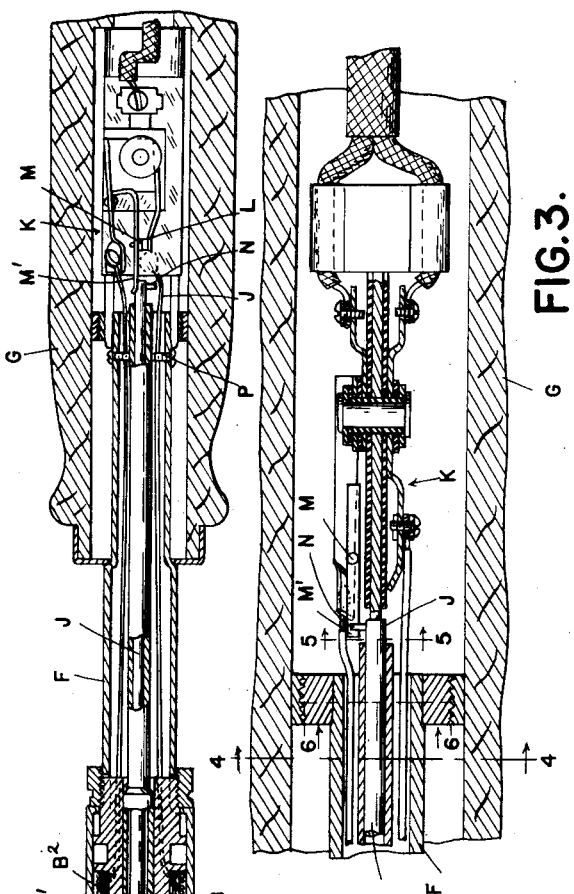
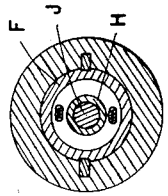
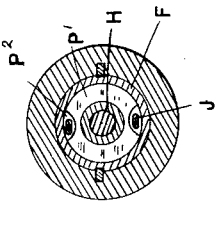
*INVENTORS*
LAURENCE H. THOMAS
FRANK KUHN
BY Whittemore Hulbert & Belknap
*ATTORNEYS*

Patented May 23, 1939

2,159,869

UNITED STATES PATENT OFFICE 2,159,869

SOLDERING IRON

Laurence H. Thomas, Birmingham, and Frank Kuhn, Detroit, Mich., assignors to American Electrical Heater Company, Detroit, Mich., a corporation of Michigan Application June 22, 1936, Serial No. 86,685

8 Claims. (Cl. 219—26)

The invention relates to electrically heated instruments and has more particular reference to electrically heated soldering irons. It is the object of the invention to provide means for automatically controlling the heat, said means being of such a character as to not interfere with the efficiency of the instrument when in use. In the present state of the art, electrically heated soldering irons and other electrically heated instruments have been provided with thermostatic controlling means. Such controlling means while avoiding the danger of injury through overheating, have a tendency to reduce the efficiency of the instrument. This is for the reason that the surface through which the heat is applied will be reduced in temperature when in contact with the work to a point considerably lower than the temperature of the electrical heating means. Consequently, if the latter is thermostatically controlled so as to avoid overheating of the instrument during the intermittent use of the same, it will not maintain a sufficiently high temperature in the instrument for constant use.

It is the object of the present invention to obtain a construction of thermostatic control which instead of responding to the temperature at the generating point, is responsive to the temperature at the point of application. Thus, where the instrument is in constant use and therefore rapidly losing heat at the point of application, a higher temperature will be maintained at the generating point than where the instrument is not in use or is only intermittently used.

It is a further object of the invention to obtain a construction having detachable or exchangeable tools and which permits of such detachment without interference with the means for thermostatic control. Still further it is an object to obtain a construction which permits of using relatively high wattage without danger of overheating. With these and other objects in view the invention consists in the construction as hereinafter set forth.

While the controlling means is applicable to various types of electrically heated instruments, the specific construction illustrated in the drawing is an electrically heated soldering iron.

In the drawing:

Figure 1 is a central longitudinal section through a soldering iron showing the thermostatic controlling means in connection therewith;

Figure 2 is an enlarged view of a portion of Figure 1 showing the thermostat;

Figure 3 is an enlarged section through the handle and switch in a plane at right angles to Figure 1;

Figures 4, 5 and 6 are cross sections respectively on lines 4—4, 5—5 and 6—6 of Figure 3;

Figure 7 is a view similar to Figure 6 showing a slightly modified construction.

The soldering iron illustrated comprises a spool-shaped member A which is surrounded by an electrical heating unit B, preferably a coiled resistor B' arranged between mica insulating sheets B² and clamped to the spool by a surrounding wire coil C. Telescopically engaging this spool is the soldering tool D having a shank portion D' that is wholly within the spool and a projecting portion D² with a pointed end D³. The spool A is arranged within an external casing E which has a reduced shank F connecting it with a handle G, preferably formed of wood or other material of relatively low thermal conductivity.

To accomplish the desired purpose of the invention the thermostat which is used for controlling the supply of electrical current is located within the tool D and at a point between the shank portion D' thereof which is in direct communication with the heating unit and the point D³ where the work is performed. Thus the abstraction of heat from the tool while work is being performed will reduce the temperature at the point of location of the thermostat before it will affect the temperature of the shank portion D' which receives the heat from the generator and consequently the generation of heat may be continued even after the shank rises to a higher temperature than that desirable at the point of the tool.

In specific construction the thermostatic control comprises a tubular casing H which is inserted within a bore in the tool D which bore extends down to near the working point. Within the lower end portion of the tube H is the thermostat I, preferably a bi-metal electrical coil, the lower end of which is anchored to the tube H, while the upper end is free. This upper end is connected to a rod J which extends upward through the tube H to a point within the handle G. K is a switch located in a recess within the handle G and comprising a stationary contact member L and a movable contact M mounted on a resilient arm M'. The end of the rod J is provided wtih a radially extending pin N which during rotation of the rod J will engage the arm M' and will move the contact M out of connection with the contact L. The tube H is also extended up into the handle G and is adjustably anchored to the casing F by suitable means, such as by set screws P. This permits of setting the control for any desired temperature while loosening the set screws P, rotating the tube H to the desired point and again clamping by the set screws.

In operation, when the coil I is heated it will unwind thereby rotating the rod J which carries the pin N towards the movable contact arm M'. The thermostat is so set that when the desired maximum temperature is attained in the portion D² of the tool, the pin N will impinge against the arm M' thereby separating the contact M from the contact L. This by opening the electrical circuit will stop further generation of heat in the heating unit B although the stored heat in the spool A may still continue to flow downward into the tool to supply heat at the point D³. As soon, however, as the temperature of the portion D³ and shank D² is lowered to a predetermined point, the coil I will wind, rotating the rod J in the reverse direction and permitting the resilient arm M' to carry the contact M against the contact L. This will again start heat generation which will continue even where the spool attains a higher temperature than that at which the thermostat is set provided that this temperature is not sufficient to raise the portion D² of the tool to this controlling point.

One important advantage of the construction is that it permits of using relatively high wattage without danger of injury to the tool or of creating a fire hazard. With soldering irons and similar tools where the generation of heat is not thermostatically controlled it is necessary to limit the wattage so as to avoid any danger of overheating. Even where there is thermostatic control of the heating element, it is still necessary to limit the wattage to a considerable degree over that which would be desirable where the tool is in constant work. With our improved construction relatively high wattage may be safely used as the temperature of the tool which is the only exposed heated portion can never rise to higher than a predetermined point. On the other hand, it can always be maintained at this point even when in constant use. This increase of wattage may be from 50% to 100% over the maximum for safety without thermostatic control.

Another important feature of the construction is that it permits of detaching and replacing the tools without interference with the means for thermostatic control. This is for the reason that the thermostat is located in a tubular core member which extends through the tool socket in concentric relation thereto. Thus the tool with its tubular shank may be inserted in the socket or withdrawn therefrom without disturbing this core.

While in the construction shown in Figure 1 the tube or core member H is shown as anchored by the set screws P which permit of rotative adjustment, it may not be necessary to provide such adjustment as the temperature can also be regulated by bending the contact members of the switch. In Figure 7 a modified construction is shown where in place of anchoring by the set screws P a head or bushing P' is placed between the tube H and the casing F to hold these members in rigid relation to each other. The bushing P' is apertured at P² for the passage of the terminal conductors J therethrough.

What we claim as our invention is:

1. In an electrically heated instrument, the combination with an electrical heating element, a casing therefor and a handle secured to said casing, of a tool having a tubular shank extending within said casing in heat conductive relation to said heating element and having a portion extending out of said casing through which the heat is conducted to the point of application to the work, a switch located in the handle of said instrument, a thermally responsive member located within the hollow shank of said tool at a point between the electrical heater and the point of application to the work, and a mechanical connection between said thermally responsive member and said switch adapted to open the circuit when a predetermined temperature is attained in the portion of the tool adjacent to said thermally responsive member.

2. In an electrically heated instrument, the combination of a tool holding socket, an electrical heating element therefor, a hollow handle for said socket, a tool having a hollow shank portion engaging said socket, a helical thermostat within the hollow shank of said tool one end of said thermostat being anchored, a rotatable rod connected to the other end of said thermostat and extending upward into said hollow handle, a switch within said hollow handle controlling said electrical heating element, said switch being operatively associated with said rotatable rod to be opened thereby.

3. In an electrically heated instrument, the combination of a tool holding socket, an electrical heating element therefor, a hollow handle for said socket, a hollow tool engaging said socket, a switch controlling said electrical heating unit located in said hollow handle, a tube extending axially through said hollow handle and socket into said hollow tool, a helical thermostat located in the portion of said tube which extends into said tool one end being anchored to said tube, a rotatable rod connected to the opposite end of said helical thermostat and extending through said tube upward into said hollow handle, a radial projection from the upper end of said rod adapted upon the rotation of said rod to open said switch and anchoring means for said tube permitting rotative adjustment thereof to set the opening of said switch at different temperatures.

4. In an electrically heated instrument, the combination of a tool holding socket, an electrical heating element therefor, a hollow handle for said socket, a core member arranged axially within said socket in fixed relation thereto and projecting beyond the same, a thermally responsive member located within said core member, a switch in said hollow handle controlling said heating element and operated by said thermally responsive member, and a hollow tool detachably engaging said socket and hollow core member.

5. In an electrically heated instrument, the combination of a tool holding socket, a removable element therefor, a hollow handle for said socket, a tube anchored in said hollow handle and projecting axially through said socket and beyond the same, a helical thermostat located in the projecting portion of said tube, a switch in said hollow handle operatively connected to said helical thermostat, and a hollow tool removably engaging said socket and tube with said helical thermostat located in the projecting portion of said tool when engaged with its socket.

6. In an electrically heated soldering iron, a socket for receiving the soldering tool, a handle for said socket, a thermostatic element anchored in said handle and extending axially through said socket and beyond the same, a hollow tool for engaging said socket and thermostat with the latter arranged within the portion extending beyond the socket, and an electrical heating unit for said socket controlled by said thermostat, said element being of a relatively high wattage such as would overheat said tool without said thermostatic control.

7. In an electrically heated soldering iron, a socket for receiving the soldering tool, a handle for said socket, a thermostatic element anchored in said handle and extending axially through said socket and beyond the same, a hollow tool for engaging said socket and thermostat with the latter arranged within the portion extending beyond the socket, and an electrical heating unit for said socket controlled by said thermostat.

8. In an electrically heated instrument, the combination of a socket for receiving a tool, an electrical heating element surrounding said socket, a hollow handle for said socket, a member anchored in said hollow handle and extending axially through said socket to project beyond the same, a thermostatic element mounted on the projecting portion of said member, a switch operated by said thermostatic element and controlling said electrical heating element, and a removable tool having a hollow shank insertable into said socket to receive heat therefrom and enclosing said thermostatic element to influence the same by the heat conducted therethrough.

LAURENCE H. THOMAS.
FRANK KUHN.